J. N. WOOD.
BALING PRESS.
APPLICATION FILED APR. 25, 1910.

971,950.

Patented Oct. 4, 1910.

4 SHEETS—SHEET 1.

WITNESSES

INVENTOR
James N. Wood
BY
Whitaker Prevost Attorneys

J. N. WOOD.
BALING PRESS.
APPLICATION FILED APR. 25, 1910.

971,950.

Patented Oct. 4, 1910
4 SHEETS—SHEET 3.

WITNESSES:

INVENTOR
James N. Wood
By Whitaker & Prevost
Attorneys

J. N. WOOD.
BALING PRESS.
APPLICATION FILED APR. 25, 1910.

971,950.

Patented Oct. 4, 1910.
4 SHEETS—SHEET 4.

WITNESSES:

INVENTOR
James N. Wood
By
Whitaker Prevost.
Attorneys

UNITED STATES PATENT OFFICE.

JAMES N. WOOD, OF RICHMOND, VIRGINIA, ASSIGNOR TO NEELY COMPRESS AND COTTON COMPANY, INC., OF RICHMOND, VIRGINIA.

BALING-PRESS.

971,950. Specification of Letters Patent. Patented Oct. 4, 1910.

Application filed April 25, 1910. Serial No. 557,515.

*To all whom it may concern:*

Be it known that I, JAMES N. WOOD, citizen of the United States, residing at Richmond, in the county of Henrico and State of Virginia, have invented certain new and useful Improvements in Baling-Presses; and I do hereby declare the following to be a full, clear, and exact description of the invention, such as will enable others skilled in the art to which it appertains to make and use the same.

My invention consists in the novel features hereinafter described reference being had to the accompanying drawings which illustrate one form in which I have contemplated embodying the said invention and the invention is fully disclosed in the following description and claims.

Figure 1:
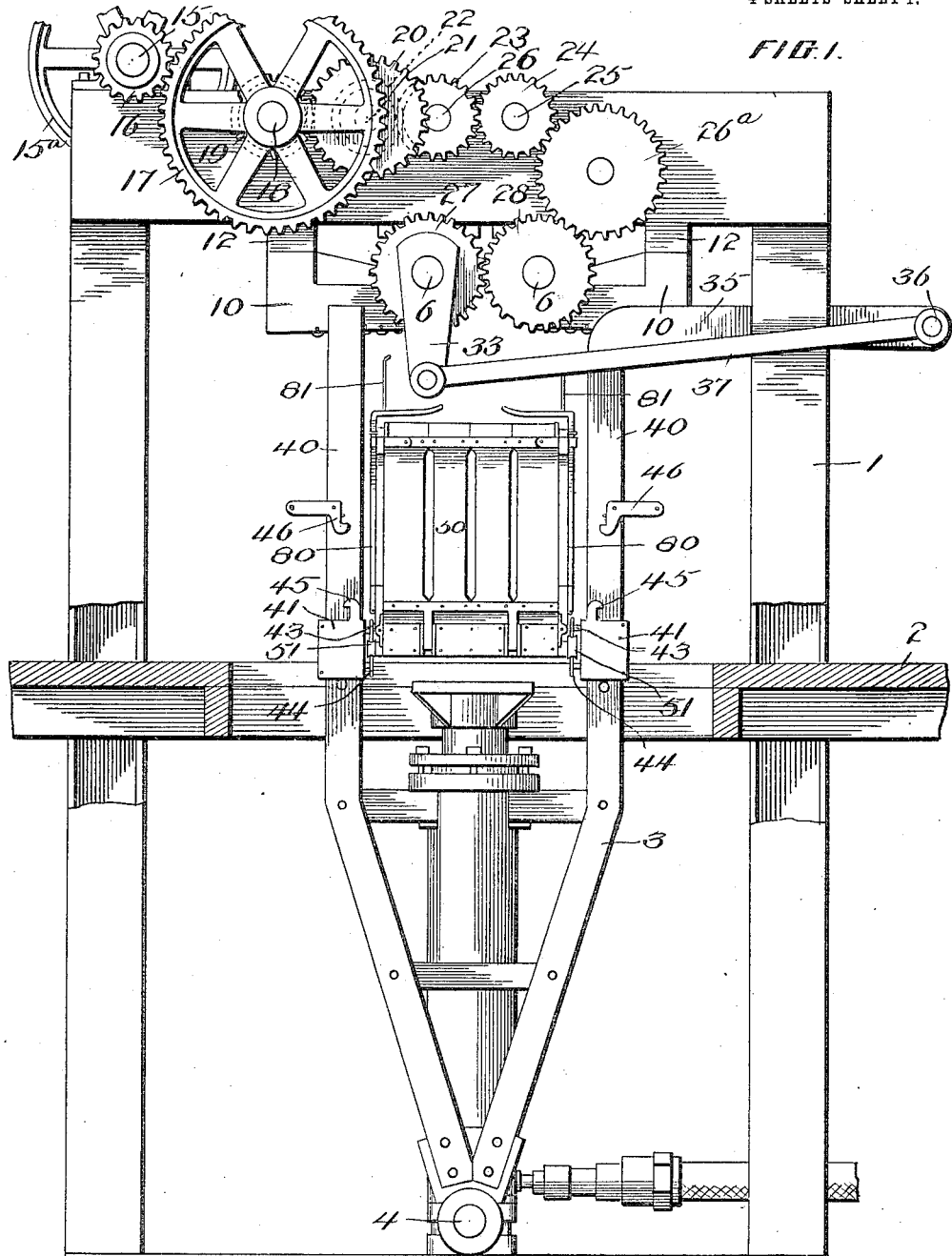
Figure 2:
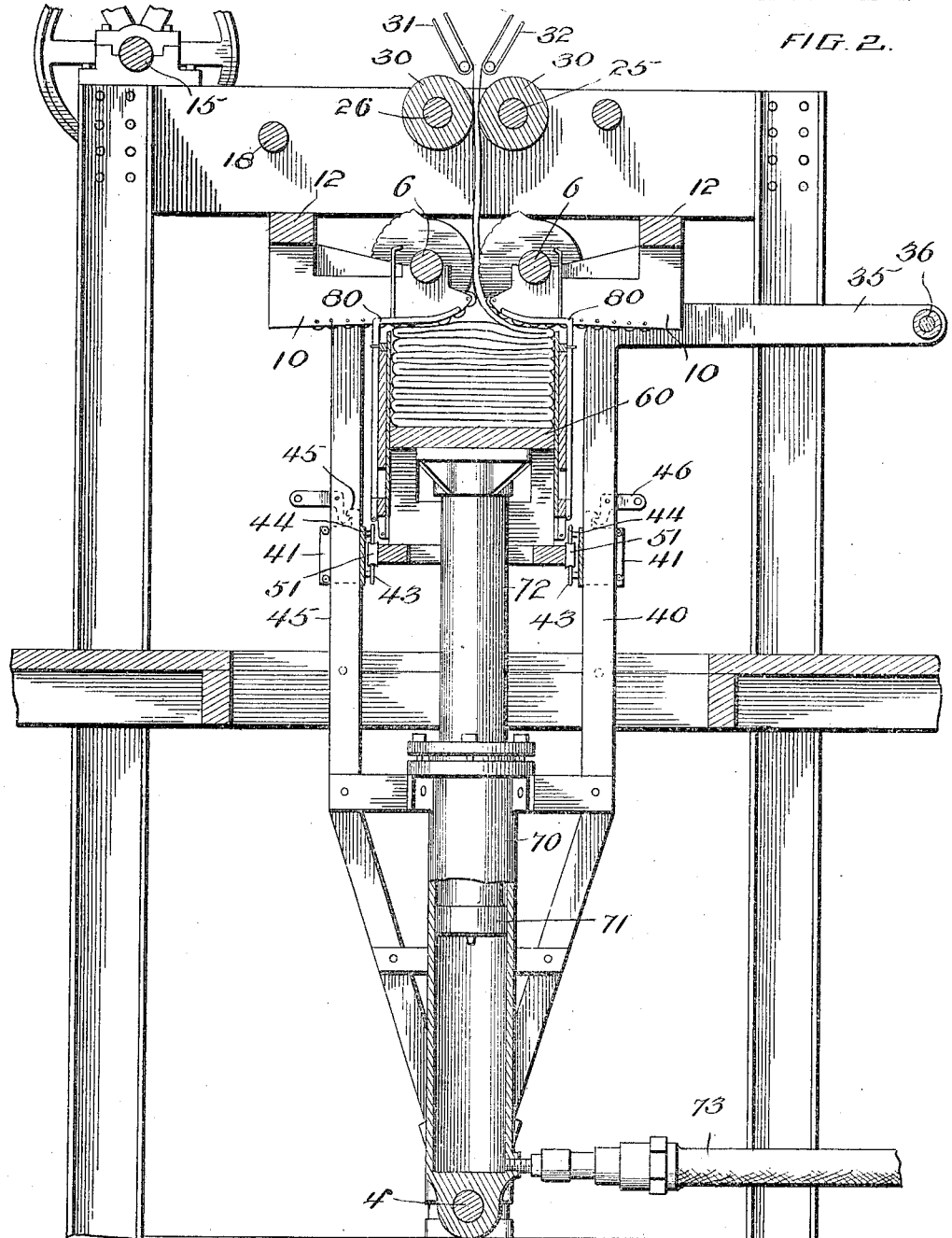
Figure 3:
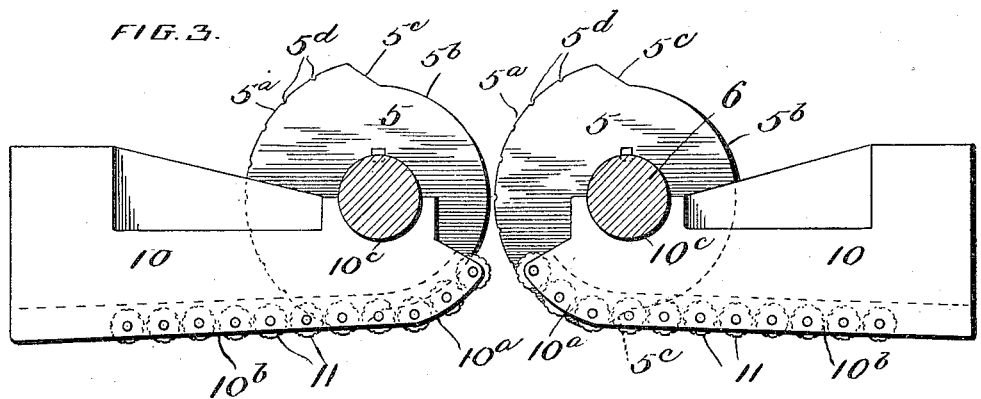
Figure 4:
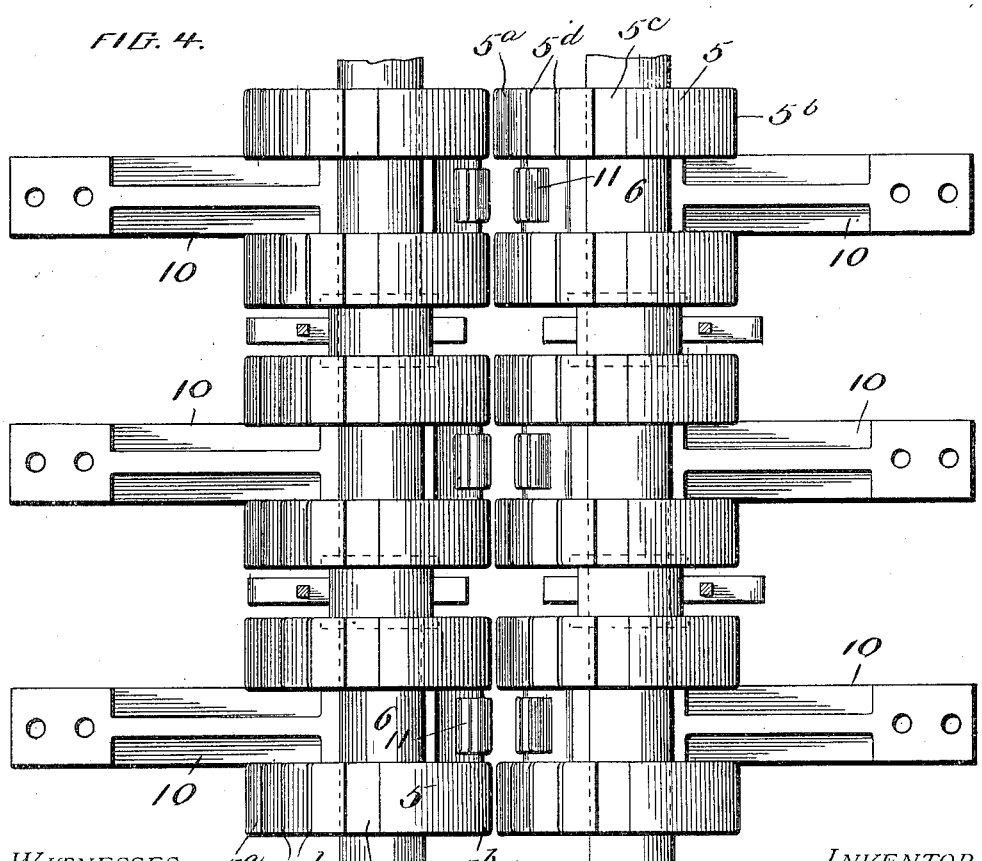
Figure 5:
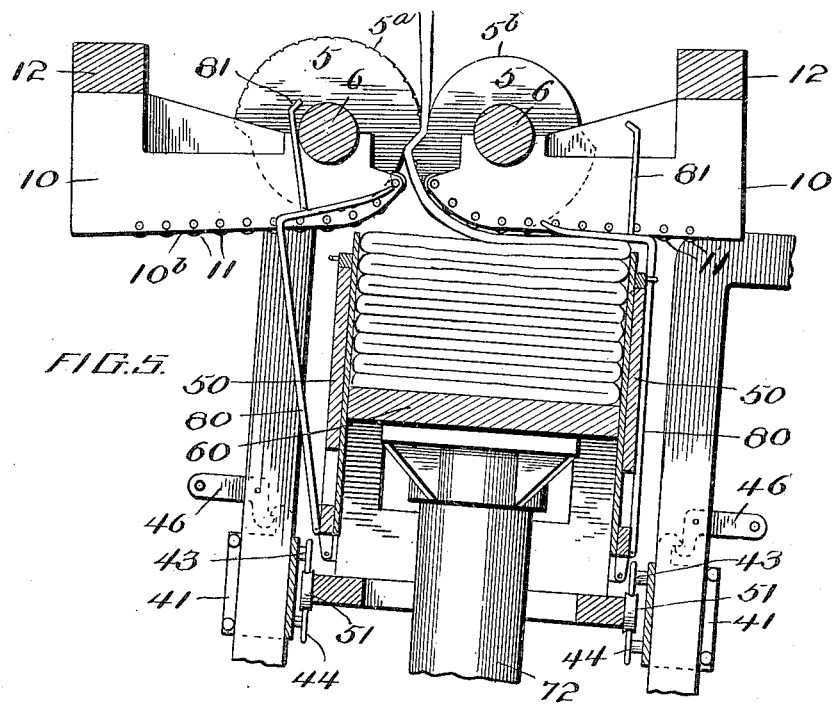
Figure 6:
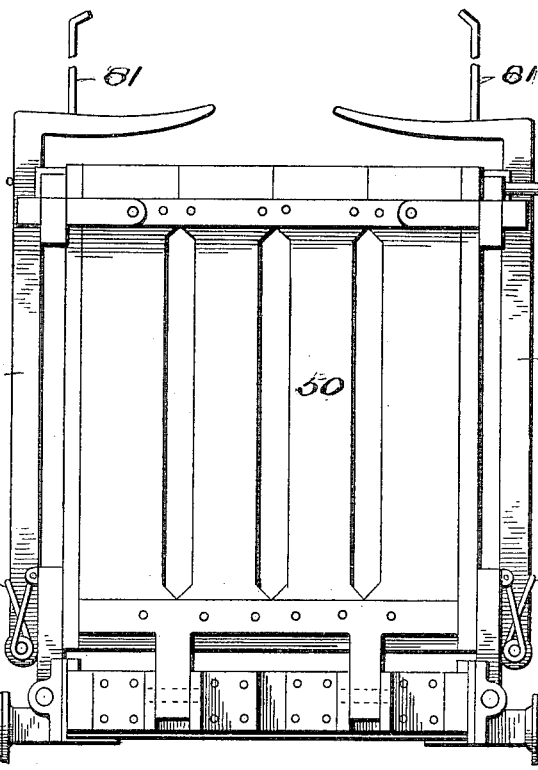

Referring to the said drawings, Figure 1 is a side elevation of a baling press embodying my invention showing the bale box in the position in the oscillating baling frame which it occupies when run in from the baling floor. Fig. 2 is a vertical sectional view of the press showing the bale box in raised position in the baling frame, and a partially completed bale therein. Fig. 3 is an enlarged side elevation of the bale forming devices. Fig. 4 is a top plan view of the same. Fig. 5 is a partial sectional view of the press showing the baling frame swung to one side of its central portion. Fig. 6 is a detail view of the bale box and bale retaining mechanism.

My invention relates to that class of baling presses in which a laminated bale is formed by feeding the material to be baled in a sheet or bat, and compressing the laminations or folds as they are fed in and folded upon the bale, and particularly to that class of such devices in which a relative lateral movement is produced between the bale forming devices and the bale box or other receptacle for holding the bale.

The object of my present invention is to provide bale forming devices by means of which the desired high degree of compression can be obtained and retained, while relieving the successive laps of the bale of frictional contact with the baling devices after they are folded and compressed on the bale, and to reduce to a minimum such frictional contact as may be necessary to retain the bale in compressed condition.

In the embodiment of my invention which I have selected for the purpose of illustrating my said invention, and which is illustrated in the accompanying drawings, the bale holding receptacle consists of a removable bale box, which is held during the baling operation in an oscillating baling frame, supported beneath the bale forming mechanism which is mounted in a stationary frame.

Referring to the said drawings, 1 represents the main frame of the press which is supported upon a suitable foundation, preferably of masonry or concrete, below the baling floor which is indicated at 2, and is provided with an aperture through which the baling frame extends vertically.

3 represents a vertically disposed baling frame, which is constructed to receive the bale box, in which the bale is formed. I prefer to employ a bale box which is separate from the baling frame, and is capable of being quickly inserted in and removed therefrom for the reason that by employing two or more of such removable bale boxes, the filled box can be removed, an empty box inserted, and another bale can be formed therein, while the previously formed bale is being secured by bale ties or bands in any well known way, and removed from its box, thus keeping the press in practically continuous operation. I have also shown herein the baling frame 3 pivoted at 4 adjacent to the bottom of the main frame, so that it can be oscillated during the formation of the bale. These constructions are preferred by me, but I wish it understood that the bale compressing and forming devices hereinafter described may also be employed with other forms of baling frames, and with other forms of bale boxes which may or may not be removable therefrom.

At the upper part of the main frame 1, are located the bale forming devices which coöperate with the movable baling frame and the bale box or receptacle carried thereby. These devices include a pair of baling rollers mounted upon shafts 6, 6 supported in suitable bearings in the main frame, and a series of stationary presser bars, 10, 10 extending laterally from each of said baling rollers. Each of the rollers consists of a plurality of separated or spaced sections or disks 5, keyed to their respective shafts and alternating with the pressure bars 10, 10 before referred to. Each of the disks 5 is provided with a major concentric face 5ᵃ (which may be termed the peripheral compressing face,) and which extends part way around the disk and a minor concentric face 5ᵇ, at a less distance from the center, extending substantially half way around the axis of the disk and connected at its extremes to the compressing face by grades 5ᶜ, 5ᶜ. The compressing face 5ᵃ of each disk is preferably corrugated or provided with indentations 5ᵈ as shown to prevent it from slipping upon the material to be baled. The disks of each roller are secured to the shaft 6 in registration and the disks of each roller are placed in the same relative position with respect to the shaft, as those of the other roller, so that as the rollers turn in opposite directions the major or compressing faces of one roller will follow those of the other roller as will be apparent from an examination of Fig. 3.

The pressure bars 10, 10, etc., alternating with the disks of each roller have their lower faces provided with portions 10ᵃ concentric with the axis of the adjacent roller and with straight portions 10ᵇ which extend in a slightly inclined position laterally and downwardly from the concentric portion 10ᵃ. The lower face of each pressure bar is provided with a series of corrugated anti-friction rollers 11, as shown to relieve the frictional contact between the said faces and the uppermost lap of the bale, and reduce the friction to a minimum. These pressure bars are mounted stationarily in the main frame. In the embodiment of my invention herein shown, each of the pressure bars has its inner end provided with a curved bearing seat, 10ᶜ engaging the lower side of the adjacent shaft 6 and its outer end secured to the under side of a transverse beam 12 forming part of the main frame, in any desired way.

In the machine illustrated in the drawings 15 represents the main driving shaft, to which power is applied in any desired manner from a suitable motor. The shaft 15 is shown as provided with a driving pulley 15ᵃ to receive a belt from a suitable source of power, and said shaft is provided at one side of the machine with a driving pinion 16 meshing with a large gear wheel 17 on a counter shaft 18, carrying a pinion 19 meshing with a gear 20 on a shaft 21, carrying a pinion 22, meshing with one of two intermeshing gears 23 and 24 on shafts 25 and 26 which carry a pair of feeding or condensing rollers 30, 30 located above the baling rollers 5. The material in the form of a sheet or bat is delivered to these rollers (or directly to the baling rollers) in any desired manner, as by a pair of oppositely inclined conveyers 31, 32 as shown in Fig. 2. In this instance the baling rollers are shown as operated by means of an intermediate gear 26ᵃ, meshing with gear 26 and with one of two intermeshing gears 27, 28 with which the shafts 6, 6 of the baling rollers are provided. In order to impart the proper oscillatory motion to the baling frame 3 in time with the movements of the baling rollers, (as hereinafter more fully described) I prefer to operate the baling frame from one of the roller shafts 6, in this instance the one at the left (Fig. 1) which is provided with cranks 33, 33 (one of which is shown in Fig. 1) connected by links 37, 37 with laterally extending arms 35, 35 extending from the baling frame and carrying a cross bar 36 to which the links are pivotally connected. This arrangement secures the proper operations and relative timing of the parts, but obviously any other arrangement of gearing which will secure the desired results may be adopted in lieu of the specific construction just described.

I prefer to form the bale in a removable bale box 50, as previously stated which may be run into the baling frame from the baling floor and secured in the frame in the desired relation with the baling rollers. The construction which I prefer to employ for this purpose is as follows. The baling frame comprises four vertical standards 40 upon which are mounted slides 41 carrying horizontal track rails 43, 44 to be engaged by grooved rollers 51, 51 on the bale box. The slides 41 carrying the bale box can be raised to bring the box into operative relation with the baling rollers and pressure bars, and secured in this position, and in this instance I have shown the slides provided with locking devices 45 adapted to engage pivoted locking catches 46 secured to the standards 40. The bale box, which is not specifically claimed herein, is preferably of the knock-down type provided with hinged sides and ends and having a bottom 60 capable of moving vertically through the box, the said bottom being engaged by the plunger 72 carried by a piston 71 working in a hydraulic cylinder 70 carried by the baling frame, and connected by a pipe 73 with a supply of liquid under pressure, or pressure may be applied to the bottom of the bale box in other ways. I prefer, however, to use hydraulic pressure.

In order to retain the material of the bale at all times in the bale box and to facilitate the removal of the box from the press when the bale box is filled and the bale formed, I provide the opposite sides of the bale box with pivoted spring actuated retaining devices 80, 80 which are in the form of frames bent at a right angle, and having their horizontal members extending over the top of the material in the bale box. These devices are pivoted at their lower ends to the box and are pressed normally inward by springs 82 and each of said frames is provided with a vertical arm 81 which extends upwardly therefrom so as to engage the adjacent shaft 6, or some other part of the machine, as the baling frame swings laterally beyond its central position, to permit the material to be compressed in the box, said retaining devices being alternately held back by the arms 81 first on one side and then on the other and being returned to their normal positions by their respective actuating springs 82.

In the operation of the press a bale box is inserted in the baling frame, raised to its operative position by any desired means and locked therein. The plunger of the pressure device is operated to raise the bottom 60 of the bale box to its highest position, and the bat is fed into the machine and laid in folds or laminations upon said bottom as the bale box and frame oscillate. The parts are so timed that as the baling frame swings in one direction, say to the right, as in Fig. 5, the material will be acted upon and compressed by the major or compressing faces of the adjacent compressing roller 5 and the material will be held in compressed condition by the pressure bars 10 adjacent to the said roller. When the baling frame has reached its extreme of movement in that direction and starts to return the material will be engaged and compressed by the major faces of the opposite compressing roller, and the continued rotation of the first mentioned roller will cause its minor faces to pass over the material during the return movement, thus relieving it from all friction save that of the pressure bars, which is sufficient to retain the material in compressed condition and the friction of which is reduced to a minimum by the anti-friction rollers 11. It will thus be seen that the material is acted upon by the major faces of first one baling roller and then the other, as the baling frame reciprocates the material being relieved from engagement with the rollers except during the time that a fresh layer is being packed or compressed upon the bale, and the compression of the formed bale being at all times retained by the pressure bars. It will also be seen that there is always sufficient room between the major faces of one baling roller and the minor faces of the other to permit the bat to be fed in between the rollers, and as the rollers are operated continuously in the same direction the feeding of the bat is facilitated rather than hindered by any contact with the baling rollers. It will also be seen by reference to Fig. 5 that as the baling frame swings in one direction or the other, the bale retaining device on the opposite side of the bale box will be arrested and held back by its arm 81 engaging the shaft 6 or other part of the machine, to permit the fresh lap or layer to be laid upon that portion of the bale which is normally beneath said arrested device, and as the baling frame returns to the central position the said retaining device will be returned to its normal position by its spring 82. When it is desired to discharge the bale, the machine is stopped with the baling frame in its median position, and the bale box is dropped to the level of the baling floor by releasing the catches 46, when it may be run out on the floor and the bale bands affixed in the usual manner. Until the bands are attached the bale will be securely held in compression by the retaining devices 80, 80.

The specific form of bale box is not herein claimed as it forms the subject matter of another application filed by me April 25, 1910, and given Serial No. 557,516, and I wish it to be understood that the improved bale forming devices herein shown and described can be advantageously employed with other forms of bale holding means, whether oscillating or reciprocable, and whether provided with removable bale boxes or not, as may be preferred.

What I claim and desire to secure by Letters Patent is:—

1. In a baling press, the combination with a pair of baling rollers each having major and minor peripheral faces, of pressure bars provided with bale engaging faces extending horizontally from each of said rollers.

2. In a baling press, the combination with a pair of baling rollers, each comprising spaced sections provided with major and minor peripheral surfaces, of a series of pressure bars, adjacent to each roller having horizontally disposed bale engaging faces, and interposed between certain of said spaced sections of the roller.

3. In a baling press, the combination with a laterally movable bale holding frame, of a pair of baling rollers provided each with major and minor peripheral surfaces, the major surfaces only being adapted to engage the bale, and stationary pressure bars having horizontally disposed bale engaging faces, extending from said baling rollers outwardly in opposite directions.

4. In a baling press, the combination with a pair of rollers, each comprising a plurality of spaced sections having bale forming major peripheral portions extending part way around the same, and minor peripheral portions of shorter radius adapted to remain out of contact with the bale, of means for rotating said rollers continuously in opposite directions, while forming the bale.

5. In a baling press, the combination with a pair of rollers, each comprising a plurality of spaced sections having bale forming major peripheral portions extending part way around the same, and minor peripheral portions of shorter radius adapted to remain out of contact with the bale, means for operating said rollers continuously in opposite directions during the formation of a bale, and pressure bars provided with horizontal bale engaging faces, extending from said rollers in opposite directions.

6. In a baling press, the combination with a pair of rollers, each comprising a plurality of spaced sections having bale forming major peripheral portions extending part way around the same, and minor peripheral portions of shorter radius adapted to remain out of contact with the bale, means for operating said rollers continuously in opposite directions during the formation of a bale, and stationary pressure bars, interposed between certain of said spaced sections and provided with horizontally disposed bale engaging faces.

7. In a baling press, the combination with an oscillating baling frame, of a pair of baling rollers each comprising a plurality of spaced sections provided with bale engaging major peripheral portions, extending part way around the same, and minor peripheral portions of shorter radius, adapted to clear the bale, stationary pressure bars interposed between certain of the spaced sections of each roller and having horizontally disposed bale engaging faces provided with anti-friction rollers, means for driving said rollers continuously in opposite directions, during the formation of the bale, means for oscillating the baling frame, and means for applying pressure to the lower face of the bale.

In testimony whereof I affix my signature, in the presence of two witnesses.

JAMES N. WOOD.

Witnesses:
    J. E. DAUGHTREY, Jr.,
    E. P. GOODWYN.